United States Patent
Okada et al.

(10) Patent No.: US 11,845,871 B2
(45) Date of Patent: Dec. 19, 2023

(54) TREATMENT LIQUID COMPOSITION FOR INK JET PIGMENT PRINTING, INK SET, AND RECORDING METHOD

(71) Applicant: Seiko Epson Corporation, Tokyo (JP)

(72) Inventors: Hideki Okada, Shiojiri (JP); Akiko Yamada, Shiojiri (JP)

(73) Assignee: SEIKO EPSON CORPORATION

( * ) Notice: Subject to any disclaimer, the term of this patent is extended or adjusted under 35 U.S.C. 154(b) by 21 days.

(21) Appl. No.: 17/389,637

(22) Filed: Jul. 30, 2021

(65) Prior Publication Data
US 2022/0033666 A1   Feb. 3, 2022

(30) Foreign Application Priority Data

Jul. 31, 2020   (JP) ................. 2020-130107

(51) Int. Cl.
| | | |
|---|---|---|
| *C09D 11/00* | (2014.01) | |
| *C09D 11/322* | (2014.01) | |
| *D06P 5/30* | (2006.01) | |
| *D06P 5/20* | (2006.01) | |
| *D06P 1/44* | (2006.01) | |
| *D06P 1/642* | (2006.01) | |
| *D06P 1/651* | (2006.01) | |
| *D06P 1/52* | (2006.01) | |
| *D06P 1/54* | (2006.01) | |
| *D06P 1/50* | (2006.01) | |

(52) U.S. Cl.
CPC ............ *C09D 11/322* (2013.01); *D06P 1/445* (2013.01); *D06P 1/50* (2013.01); *D06P 1/5285* (2013.01); *D06P 1/54* (2013.01); *D06P 1/6424* (2013.01); *D06P 1/65118* (2013.01); *D06P 5/2066* (2013.01); *D06P 5/30* (2013.01)

(58) Field of Classification Search
CPC ....... C09D 11/322; C09D 11/14; C09D 11/40; C09D 11/54; C09D 11/38; D06P 1/445; D06P 1/50; D06P 1/5285; D06P 1/54; D06P 1/6424; D06P 1/65118; D06P 5/2066; D06P 5/30; D06P 1/44; D06P 1/5242; D06P 1/5278; D06P 5/002; D06P 5/225
USPC ....................................... 106/31.46
See application file for complete search history.

(56) References Cited

U.S. PATENT DOCUMENTS

| | | | |
|---|---|---|---|
| 2003/0070582 A1* | 4/2003 | Kitamura | C09D 11/03 |
| | | | 106/31.77 |
| 2006/0010619 A1 | 1/2006 | Hees et al. | |
| 2015/0299948 A1 | 10/2015 | Pan et al. | |
| 2015/0375528 A1 | 12/2015 | Kitagawa et al. | |
| 2016/0108577 A1 | 4/2016 | Gulati | |
| 2017/0058453 A1 | 3/2017 | Pan et al. | |
| 2017/0233595 A1 | 8/2017 | Erdodi et al. | |
| 2018/0282567 A1 | 10/2018 | Ishida | |

(Continued)

FOREIGN PATENT DOCUMENTS

| | | | | |
|---|---|---|---|---|
| CN | 110337473 A | * | 10/2019 | .......... C09D 175/04 |
| CN | 110799698 B | * | 8/2022 | ................ D06P 5/30 |

(Continued)

*Primary Examiner* — Eisa B Elhilo
(74) *Attorney, Agent, or Firm* — Harness, Dickey & Pierce, P.L.C.

(57) ABSTRACT

A treatment liquid composition for ink jet pigment printing is a treatment liquid composition which is used to be adhered to a cloth and which includes a block isocyanate compound, a hydroxyethyl cellulose, and a cationic compound.

10 Claims, 1 Drawing Sheet

(56) References Cited

U.S. PATENT DOCUMENTS

| | | | |
|---|---|---|---|
| 2019/0003115 A1* | 1/2019 | Ohashi | .................... D06P 1/647 |
| 2019/0367762 A1 | 12/2019 | Loccufier | |
| 2019/0375223 A1 | 12/2019 | Rahimi et al. | |
| 2020/0040523 A1* | 2/2020 | Miyasa | ..................... D06P 1/50 |
| 2020/0165474 A1* | 5/2020 | Nakamura | .............. C08L 69/00 |
| 2021/0070082 A1 | 3/2021 | Guo et al. | |
| 2021/0071026 A1 | 3/2021 | Toeda et al. | |
| 2021/0246327 A1 | 8/2021 | Zheng et al. | |
| 2021/0324575 A1 | 10/2021 | Zhou et al. | |
| 2021/0363373 A1 | 11/2021 | Zhou et al. | |

FOREIGN PATENT DOCUMENTS

| | | | | |
|---|---|---|---|---|
| JP | 2016-011466 A | | 1/2016 | |
| JP | 2017-206789 A | | 11/2017 | |
| JP | 2018-165417 A | | 10/2018 | |
| JP | 2018168255 A | * | 11/2018 | ........... C09D 11/322 |
| JP | 2019-194368 A | | 11/2019 | |

\* cited by examiner

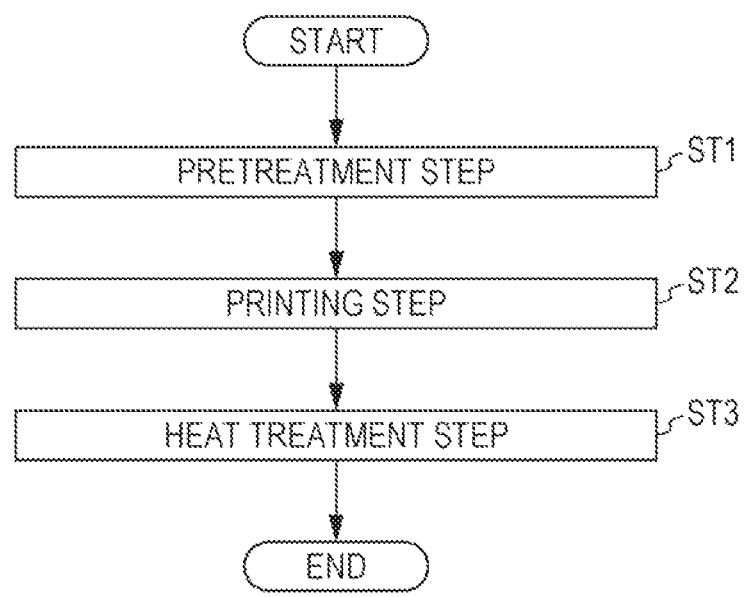

TREATMENT LIQUID COMPOSITION FOR INK JET PIGMENT PRINTING, INK SET, AND RECORDING METHOD

The present application is based on, and claims priority from JP Application Serial Number 2020-130107, filed Jul. 31, 2020, the disclosure of which is hereby incorporated by reference herein in its entirety.

BACKGROUND

1. Technical Field

The present disclosure relates to a treatment liquid composition for ink jet pigment printing, an ink set, and a recording method.

2. Related Art

An ink jet recording method is able to record a highly fine image by a relatively simple apparatus and has been rapidly developed in various fields. In particular, various investigations have been carried out to more stably obtain a recorded matter having a higher quality.

For example, JP-A-2017-206789 has disclosed a printing pretreatment agent which can be applied to a disperse dye and which is comprehensively excellent in terms of suppression of ink bleeding toward a surface direction and a thickness direction of a cloth, texture of a dyed cloth, and easy removal of excessive dye and pretreatment agent. This pretreatment agent is a pretreatment agent for printing by a disperse dye ink and contains a hydroxyethyl cellulose, a cationic resin having a plus ion charge density of 2 to 9 mEq/g, and water.

However, when pigment printing is performed on a recording medium including a cloth by ink jet recording using a pretreatment liquid as disclosed in JP-A-2017-206789, a pigment printing ink tends to stay in the vicinity of a surface of the cloth, and hence, a fastness, in particular, a wet rubbing fastness, of a recorded matter to be obtained is degraded.

SUMMARY

Through intensive research carried out to solve the above problem, the present inventors found that by using a treatment liquid composition for ink jet pigment printing which is used to be adhered to a cloth and which includes a block isocyanate compound, a hydroxyethyl cellulose, and a cationic compound, a recorded matter excellent in fastness can be obtained, and as a result, the present disclosure was completed.

That is, according to an aspect of the present disclosure, there is provided a treatment liquid composition for ink jet pigment printing which is used to be adhered to a cloth and which includes a block isocyanate compound, a hydroxyethyl cellulose, and a cationic compound.

BRIEF DESCRIPTION OF THE DRAWINGS

FIGURE is a flowchart showing one example of a recording method of this embodiment.

DESCRIPTION OF EXEMPLARY EMBODIMENTS

Hereinafter, if needed, with reference to the drawing, although an embodiment (hereinafter, referred to as "this embodiment") of the present disclosure will be described in detail, the present disclosure is not limited thereto and may be variously changed and/or modified without departing from the scope of the present disclosure. In addition, in this specification, a "(meth)acrylic-based resin" indicates both an acrylic-based resin and a methacrylic-based resin corresponding thereto.

In this specification, "pigment printing" indicates recording (printing) of an ink composition containing a pigment on a recording medium including a cloth and may also be called simply "printing" or "recording". In addition, "ink jet pigment printing" indicates recording (printing) of an ink composition containing a pigment on a recording medium including a cloth by an ink jet method and is one type of ink jet recording. A "recorded matter" indicates a matter in which an image is formed by recording an ink composition on a recording medium including a cloth.

Treatment Liquid Composition

A treatment liquid composition of this embodiment is used to be adhered to a cloth and contains a block isocyanate compound, a hydroxyethyl cellulose, and a cationic compound. In addition, although being used for ink jet pigment printing, the treatment liquid composition of this embodiment may be a liquid composition which is used to be adhered to the same cloth as that to which an ink composition containing a pigment is adhered and may also be a liquid composition to be adhered to a cloth by a method other than an ink jet method, that is, for example, by a coating method using a roll coater or the like which will be described later. In addition, although being able to be adhered to a cloth before, after, or during the ink composition is adhered thereto, the treatment liquid composition of this embodiment is preferably adhered to a cloth before the ink composition is adhered thereto.

The reason a recorded matter excellent in fastness can be obtained by using the treatment liquid composition of this embodiment is believed as described below. However, the reason is not limited to that described below. That is, in the case of using a related treatment liquid composition, when pigment printing is performed on a recording medium including a cloth by ink jet recording, under wet conditions, an ink layer is liable to be peeled away from cloth fibers, or a fiber layer is liable to be broken due to embrittlement thereof by wetting. On the other hand, when pigment printing is performed on a recording medium including a cloth using the treatment liquid composition of this embodiment, since a cross-linked structure is formed by a reaction between an isocyanate group of the block isocyanate compound and the hydroxyethyl cellulose, a recorded matter excellent in fastness is estimated to be obtained. In addition, since the treatment liquid composition of this embodiment is used, a recorded matter excellent in color development may also be obtained.

Block Isocyanate Compound

The treatment liquid composition contains a block isocyanate compound. The block isocyanate compound preferably has at least two isocyanate groups, and at least one of the isocyanate groups of the isocyanate compound is a blocked isocyanate group. Hereinafter, when a portion other than a blocked portion of the blocked isocyanate group is described, the block isocyanate compound is described as an isocyanate compound. The blocked isocyanate compound may be used alone, or at least two types thereof may be used in combination.

Although the isocyanate compound is not particularly limited, for example, a diisocyanate compound having two isocyanate groups or a triisocyanate compound having three isocyanate groups may be mentioned. In addition, although being a composition which has besides the isocyanate groups, for example, an aliphatic or an aromatic portion, the isocyanate compound described above is preferably an aliphatic compound and more preferably an aliphatic diisocyanate compound.

The isocyanate compound may have a linear, a branched, or a cyclic structure, and a bond forming the molecular chain described above may be either a saturated bond or an unsaturated bond. In addition, the isocyanate compound may have at least one substituent and may also be a compound which is linked to a high molecular weight compound with a substituent interposed therebetween. Furthermore, the portion of the isocyanate compound other than the isocyanate groups may be formed from a hydrocarbon skeleton or a carbon skeleton to which, besides at least one hydrogen atom, at least one type of hetero atom selected from the group consisting of an oxygen atom, a nitrogen atom, a sulfur atom, and a chloride atom is boned. Of those mentioned above, a portion which links two isocyanate groups preferably contains neither oxygen nor nitrogen and is preferably a hydrocarbon skeleton. In particular, in order to further improve both the color development and rubbing fastness, the portion of the isocyanate compound other than the isocyanate groups is preferably formed from a hydrocarbon skeleton.

An isocyanate group is a highly reactive group and is unstable so as to easily react with water in an aqueous solvent. However, when the blocked isocyanate group in which the isocyanate group is protected by a protective group is formed, the isocyanate group may be stably used even in an aqueous solvent. In other words, since being masked (protected) by a blocking agent, a highly reactive isocyanate group can be made to be stably present in an aqueous solvent as the blocked isocyanate group.

In addition, when the blocking agent is dissociated (for deprotection) by a heating treatment, the isocyanate group is reproduced in an aqueous solvent to exhibit a preferable reactivity to a material, such as a hydroxyethyl cellulose, having an active hydrogen.

The blocked isocyanate group is an isocyanate group protected by a protective group. Since the blocked isocyanate compound has a blocked isocyanate group, a stability thereof in water can be enhanced as compared to that in the case in which no protection is performed. Accordingly, the stability of the block isocyanate compound in the treatment liquid composition is enhanced, and hence, a storage stability of the treatment liquid composition is improved.

Although the blocking agent capable of forming a blocked isocyanate group is not particularly limited, for example, dimethyl pyrazole, diethyl malonate, methyl ethyl ketoxime, ε-caprolactam, or 1,2,4-triazole may be mentioned. Among those mentioned above, dimethyl pyrazole or methyl ethyl ketoxime is preferable. Since the blocked isocyanate group protected by the blocking agent is formed in the isocyanate compound, the block isocyanate compound can be stably present in an aqueous solvent. In addition, since being generated by heating, the isocyanate group is able to react with a hydroxy group, an amino group, or the like. The blocking agent may be used alone, or at least two types thereof may be used in combination.

The isocyanate group is able to react with a hydroxy group of a hydroxyethyl cellulose or the like. In addition, the isocyanate group is also able to react with a group other than a hydroxy group, and those reactions each may be controlled, for example, by a temperature and/or a concentration. When a cellulose is included in a cloth to which the treatment liquid composition is adhered, an isocyanate group of an aliphatic diisocyanate compound and a hydroxy group of the cellulose react with each other to form an urethane bond, so that the two compounds described above can be chemically bonded to each other. In addition, by adjustment of the degree of heating and the concentration, the degree of reaction with the cellulose or the like can be controlled, and for example, after the treatment liquid composition is adhered to a cloth, some or all of the blocked isocyanate groups may be allowed to stay on the cloth without being used for the reaction.

The isocyanate group and a hydroxy group react with each other to form an urethane bond. However, an object with which the isocyanate group reacts is not always required to have a hydroxy group, and in accordance with various types of chemical structures included in the object, a functional group with which the isocyanate group reacts may be changed. For example, an urea bond is formed by a reaction between the isocyanate group and an amino group, an urea bond is formed by a reaction between a plurality of isocyanate groups and water, a biuret bond is formed by a reaction between an urea bond and the isocyanate group, and an allophanate bond is formed by a reaction between an urethane bond and the isocyanate group. Since those bonds each can be positively generated or not generated by a reaction temperature and the like, in accordance with a chemical structure present in an object to which an aliphatic diisocyanate compound is adhered, a bond can also be generated.

A content of the block isocyanate compound in terms of a solid content with respect to the total mass of the treatment liquid composition is preferably 0.01 to 30 percent by mass, more preferably 0.05 to 10 percent by mass, and further preferably 0.1 to 5.0 percent by mass. Since the content of the block isocyanate compound is in the range described above, a recorded matter more excellent in fastness tends to be obtained.

Hydroxyethyl Cellulose

The treatment liquid composition contains a hydroxyethyl cellulose. The hydroxyethyl cellulose is preferably a water-soluble high molecular weight compound. The hydroxyethyl cellulose is preferably present dissolved in the treatment liquid composition. High molecular weight chains of the hydroxyethyl cellulose are likely to be entangled with fibers of a cloth, and in addition, the hydroxyethyl cellulose tends to relatively increase a viscosity of the treatment liquid composition. Accordingly, when the treatment liquid composition is adhered, the hydroxyethyl cellulose has a function so that the treatment liquid composition is easily maintained on a surface of a cloth. By the function described above, when ink jet pigment printing is performed on a cloth to which the treatment liquid composition is adhered, generation of strike-through of a pigment is suppressed, and the color development can be improved. In this specification, "water-soluble" indicates a characteristic in which at least 3 percent by mass can be dissolved in ion-exchanged water at 20° C. The hydroxyethyl cellulose may be used alone, or at least two types thereof may be used in combination.

As the hydroxyethyl cellulose, a commercially available product thereof may also be used, and for example, there may be mentioned HEC Daicel (registered trademark) SP200, SP400, SP500, SP600, SP850, SP900, SE400, SE550, SE600, SE850, SE900, or EE820 (trade name, manufactured by Daicel FineChem Ltd.); or AL-15, AG-15F, AH-15F, AV-15F, AW-15F, AX-15, SW-25F, SZ-25F, CF-G, CF-V, CF-W, CF-X, or CF-Y (trade name, manufactured by Sumitomo Seika Chemicals Company, Limited).

A content of the hydroxyethyl cellulose in terms of a solid content with respect to the total mass of the treatment liquid composition is preferably 0.01 to 30 percent by mass, more preferably 0.05 to 10 percent by mass, and further preferably 0.1 to 1.0 percent by mass. Since the content of the hydroxyethyl cellulose is in the range described above, a recorded matter more excellent in fastness tends to be obtained. In particular, since the content of the hydroxyethyl cellulose is 30 percent by mass or less, a recorded matter more excellent in wet rubbing fastness tends to be obtained.

Cationic Compound

The treatment liquid composition may contain any one of a polyvalent metal salt, a cationic polymer, and a cationic surfactant, and in order to obtain a recorded matter more excellent in fastness, a polyvalent metal salt or a cationic polymer is preferably contained. The cationic compound may be used alone, or at least two types thereof may be used in combination.

In order to effectively and surely obtain the effect of the present disclosure, as the cationic polymer, for example, there may be preferably used a polyethyleneimine; a polyallylamine resin, such as a polydiallylamine or a polyallylamine; an alkylamine polymer; or a polymer having one of a primary to a tertiary amino group or a quaternary ammonium base disclosed in one of JP-A-59-20696, JP-A-59-33176, JP-A-59-33177, JP-A-59-155088, JP-A-60-11389, JP-A-60-49990, JP-A-60-83882, JP-A-60-109894, JP-A-62-198493, JP-A-63-49478, JP-A-63-115780, JP-A-63-280681, JP-A-1-40371, JP-A-6-234268, JP-A-7-125411, and JP-A-10-193776. From the same point as described above, a weight average molecular weight of each of those cationic polymers is preferably 5,000 or more and more preferably 5,000 to approximately 100,000. The weight average molecular weight of the cationic polymer can be measured by a gel permeation chromatography which uses a polystyrene as a reference substance.

Among the cationic polymers, an amine-based resin is preferable in terms of excellent image quality. As the amine-based resin, for example, a cationic polyallylamine resin, polyamine resin, or polyamide resin may be mentioned. The polyallylamine resin, the polyamine resin, and the polyamide resin are resins having a polyallylamine structure, a polyamine structure, and a polyamide structure, respectively, in their main skeletons. The cationic resin may be water soluble or water insoluble in the form of resin particles and is preferably water soluble. The cationic resin particles are used as a flocculant. The cationic polymer may be used alone, or at least two types thereof may be used in combination.

Although the polyvalent metal salt is not particularly limited, in order to effectively and surely obtain the effect of the present disclosure, a polyvalent metal salt of an inorganic acid or a polyvalent metal salt of an organic acid is preferable. Although the polyvalent metal salt as described above is not particularly limited, for example, there may be mentioned a salt of an alkaline earth metal (such as magnesium or calcium) of Group II of the periodic table, a transition metal (such as lanthanum) of Group III of the periodic table, an earth metal (such as aluminum) of Group XIII of the periodic table, or a lanthanoid (such as neodymium). In addition, as the salt of the polyvalent metal mentioned above, for example, a carboxylate salt (such as a formate, an acetate, or a benzoate), a sulfate, a nitrate, a chloride, or a thiocyanate is preferable. In particular, as the polyvalent metal salt, at least one selected from the group consisting of a calcium salt or a magnesium salt of a carboxylic acid (such as formic acid, acetic acid, or benzoic acid), a calcium salt or a magnesium salt of sulfuric acid, a calcium salt or a magnesium salt of nitric acid, calcium chloride, magnesium chloride, and a calcium salt or a magnesium salt of thiocyanic acid is preferable. The polyvalent metal salt may be used alone, or at least two types thereof may be used in combination.

Although the organic acid is not particularly limited, a carboxylic acid is preferable, and for example, maleic acid, acetic acid, oxalic acid, malonic acid, succinic acid, or citric acid may be mentioned. Among those mentioned above, a monovalent or a divalent carboxylic acid is preferable. Since the carboxylic acid as described above is contained, aggregation effects of a polymer and a wax are further improved, and hence, the color development tends to be further improved. The organic acid may be used alone, or at least two types thereof may be used in combination.

A content of the cationic compound in terms of a solid content with respect to the total mass of the treatment liquid composition is preferably 0.1 percent by mass or more, more preferably 0.5 to 10 percent by mass, and further preferably 1.0 to 5.0 percent by mass. Since the content of the cationic compound is in the range described above, a recorded matter more excellent in fastness tends to be obtained.

Resin Particles

In order to obtain a recorded matter more excellent in fastness, the treatment liquid composition of this embodiment preferably contains resin particles. The resin particles are particles containing a resin and are also called a "resin dispersion" or a "resin emulsion". As the resin particles, one type of resin particles may be used alone, or at least two types of resin particles may be used in combination.

The resin particles of this embodiment may be self-dispersible resin particles into which a hydrophilic component necessary for stable dispersion in water is introduced or resin particles having a water dispersible property by using an external emulsifier. However, in order not to disturb a reaction with a polyvalent metal compound to be contained in a recording medium, the resin particles are preferably a self-emulsifying type resin dispersion.

As a resin contained in the resin particles of this embodiment, for example, there may be mentioned an urethane-based resin, a polycarbonate-based resin, a (meth)acrylic-based resin, a polyester-based resin, a styrene-based resin, a silicone-based resin, a styrene-acrylic-based resin, a fluorene-based resin, a polyolefin-based resin, a rosin-modified resin, a terpene-based resin, a polyamide-based resin, an epoxy-based resin, a vinyl chloride-based resin, a vinyl chloride-vinyl acetate-based copolymer, or an ethylene-vinyl acetate-based resin. The resin may be used alone, or at least two types thereof may be used in combination.

Although the resin may be any one of an anionic, a cationic, or a nonionic resin, the resin is preferably a cationic resin and more preferably a cationic urethane-based resin. As the cationic urethane-based resin, a commercially available product thereof may be used, and for example, there may be used Hydran CP-7010, CP-7020, CP-7030, CP-7040, CP-7050, CP-7060, or CP-7610 (trade name, manufactured by DIC Corporation); Superflex 600, 610, 620, 630, 640, or 650 (trade name, manufactured by DKS Co., Ltd.); or Urethane Emulsion WBR-2120C or WBR-2122C (trade name, manufactured by Taisei Fine Chemical C., Ltd.).

A content of the resin particles in terms of a solid content with respect to the total mass of the treatment liquid composition is preferably 0.1 percent by mass or more, more preferably 0.5 to 10 percent by mass, and further preferably 1.0 to 5.0 percent by mass. Since the content of the resin particles is in the range described above, a recorded matter more excellent in texture and fastness tends to be obtained.

Surfactant

In view of glossiness, the treatment liquid composition preferably contains a surfactant. Although the surfactant is not particularly limited, for example, there may be mentioned an acetylene glycol-based surfactant, a fluorine-based surfactant, or a silicone-based surfactant. Since the surfactant is contained, permeation of the treatment liquid composition into a cloth can be adjusted, and a recorded matter excellent in texture tends to be obtained. The surfactant may be used alone, or at least two types thereof may be used in combination.

Although the acetylene glycol-based surfactant is not particularly limited, at least one selected from 2,4,7,9-tetramethyl-5-decyne-4,7-diol, an alkylene oxide adduct thereof, 2,4-dimethyl-5-decyne-4-ol, or an alkylene oxide adduct thereof is preferable. Although a commercially available product of the acetylene glycol-based surfactant is not particularly limited, for example, there may be mentioned Olfine 104 Series or E Series, such as Olfine E1010 (trade name, manufactured by Air Products Japan, Inc.); or Surfynol 104, 465, 485, 61, or DF110D (trade name, manufactured by Nisshin Chemical Industry Co., Ltd.). The acetylene glycol-based surfactant may be used alone, or at least two types thereof may be used in combination.

Although the fluorine-based surfactant is not particularly limited, for example, there may be mentioned a perfluoroalkyl sulfonate, a perfluoroalkyl carboxylate, a perfluoroalkyl phosphate, a perfluoroalkyl ethylene oxide adduct, a perfluoroalkyl betaine, or a perfluoroalkyl amine oxide compound. Although a commercially available product of the fluorine-based surfactant is not particularly limited, for example, there may be mentioned S-144 or S-145(trade name, manufactured by Asahi Glass Co., Ltd.); FC-170C, FC-430, or Fluorad FC4430 (trade name, manufactured by Sumitomo 3M Limited); FSO, FSO-100, FSN, FSN-100, or FS-300 (trade name, manufactured by Du Pont); or FT-250 or 251 (trade name, manufactured by Neos Co., Ltd.). The fluorine-based surfactant may be used alone, or at least two types thereof may be used in combination.

Although the silicone-based surfactant is not particularly limited, for example, a polysiloxane-based compound or a polyether modified organosiloxane may be mentioned. Although a commercially available product of the silicone-based surfactant is not particularly limited, for example, there may be mentioned SAG 503A (trade name, manufactured by Nisshin Chemical Industry Co., Ltd.); BYK-028, BYK-306, BYK-307, BYK-333, BYK-341, BYK-345, BYK-346, BYK-347, BYK-348, or BYK-349 (trade name, manufactured by BYK); or KF-351A, KF-352A, KF-353, KF-354L, KF-355A, KF-615A, KF-945, KF-640, KF-642, KF-643, KF-6020, X-22-4515, KF-6011, KF-6012, KF-6015, or KF-6017 (trade name, manufactured by Shin-Etsu Chemical Co., Ltd.). The silicone-based surfactant may be used alone, or at least two types thereof may be used in combination.

A hydrophilic-lipophilic balance (HLB) value of the surfactant is preferably 10 or more, more preferably 13 or more, and further preferably 15 to 20. Since the HLB value of the surfactant is in the range described above, an excessive permeation of an ink into a cloth is suppressed, and a recorded matter more excellent in texture tends to be obtained. The HLB value of the surfactant may be obtained by a known method, such as Griffin's method.

A surface tension of the surfactant is preferably 40 mN/m or more, more preferably 45 mN/m or more, and further preferably 50 to 100 mN/m. Since the surface tension of the surfactant is in the range described above, an excessive permeation of an ink into a cloth is suppressed, and a recorded matter more excellent in color development tends to be obtained. The surface tension of the surfactant may be obtained by a known method. The surface tension of the surfactant may be measured at 23° C. by Wilhelmy method using a 0.1%-aqueous solution. As a measurement device, for example, an automatic surface tension meter "DY-300" manufactured by Kyowa Interface Science Co., Ltd. may be used.

A content of the surfactant with respect to the total mass of the treatment liquid composition is preferably 0.01 to 3.0 percent by mass, more preferably 0.05 to 2.0 percent by mass, and further preferably 0.1 to 1.0 percent by mass. Since the content of the surfactant is in the range described above, a recorded matter more excellent in texture tends to be obtained.

Water

The treatment liquid composition may contain water. As the water of this embodiment, for example, purified water, such as ion-exchanged water, ultrafiltration water, reverse osmosis water, or distilled water, may be mentioned, or water, such as ultrapure water, from which ionic impurities are removed as much as possible may also be mentioned. In addition, when water sterilized, for example, by ultraviolet ray irradiation or addition of hydrogen peroxide is used, in the case in which a condensate is stored for a long period of time, generation of fungi and/or bacteria can be prevented. Hence, the storage stability of the treatment liquid composition tends to be further improved.

The treatment liquid composition may contain at least one of an alkaline agent and a hydrotropic agent. A content of each of those compounds in the treatment liquid composition may be appropriately set in accordance with the type of cloth and the like and is not particularly limited.

When a dye is used, the alkaline agent is preferably used since a dyeing property of the dye is further improved. As a particular example of the alkaline agent, for example, sodium carbonate, sodium hydrogen carbonate, sodium hydroxide, trisodium phosphate, or sodium acetate may be mentioned.

The hydrotropic agent is preferably used since the color development of an image to be recorded is improved. As the hydrotropic agent, for example, an urea may be mentioned.

The treatment liquid composition may also contain a glue agent. As the glue agent, for example, there may be mentioned a starch material such as corn or wheat; a cellulose-based material, such as a carboxymethyl cellulose or a hydroxymethyl cellulose; a polysaccharide, such as sodium alginate, gum arabic, locust bean gum, gum tragacanth, guar gum, or tamarind seeds; a protein, such as gelatin or casein; a natural water-soluble high molecular weight material, such as tannin or lignin; or a synthetic water-soluble high molecular weight material, such as a poly(vinyl alcohol)-based compound, a poly(ethylene oxide)-based compound, an acrylic acid-based compound, or a maleic anhydride-based compound.

The treatment liquid composition may also contain components, such as a lubricant, a reduction inhibitor, an antiseptic agent/fungicide, such as Proxel XL2 (trade name, manufactured by Arch Chemicals), an anti-mold agent, a softener, a chelating agent (such as sodium ethylenediaminetetraacetic acid: EDTA) trapping metal ions which influence dispersion, a pH adjuster such as potassium hydroxide, a solubilizer, a viscosity adjuster, an antioxidant, and/or a corrosion inhibitor, which are generally used for a treatment liquid composition for printing.

Ink Set

An ink set of this embodiment includes the treatment liquid composition of this embodiment and at least one ink composition for ink jet pigment printing. The ink composition of this embodiment contains a pigment and is an ink to be used for recording (printing) on a recording medium including a cloth by an ink jet method.

The ink composition of this embodiment is able to appropriately contain resin particles, a surfactant, water, and the like, which are the components also contained in the treatment liquid composition described above, and the description of the above components may also be applied to the description of the components of the ink composition.

Pigment

The ink composition of this embodiment contains a pigment. In addition, the treatment liquid composition may also contain a pigment. The pigment may be contained in the composition as particles containing a pigment. Although the pigment is not particularly limited, for example, the following may be mentioned.

The ink compositions may be discriminated as a cyan ink, a magenta ink, a yellow ink, a black ink, a white ink, and the like.

Although a pigment used for the cyan ink is not particularly limited, for example, there may be mentioned C.I. Pigment Blue 1, 2, 3, 15, 15:1, 15:2, 15:3, 15:34, 15:4, 16, 18, 22, 25, 60, 65, or 66, C.I. Vat Blue 4 or 60, or C.I. Direct Blue 199.

Although a pigment used for the magenta ink is not particularly limited, for example, there may be mentioned C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48:2, 48:5, 57:1, 88, 112, 114, 122, 123, 144, 146, 149, 150, 166, 168, 170, 171, 175, 176, 177, 178, 179, 184, 185, 187, 202, 209, 219, 224, or 245, or C.I. Pigment Violet 19, 23, 32, 33, 36, 38, 43, or 50.

Although a pigment used for the black ink is not particularly limited, a carbon black may be mentioned. Although a concrete trade name of the carbon black is not particularly limited, for example, there may be mentioned Bonjetblack CW-1 (manufactured by Orient Chemical Industries Co., Ltd.); No. 2300, No. 900, MCF88, No. 33, No. 40, No. 45, No. 52, MA7, MA8, MA100, No. 2200B, or the like (manufactured by Mitsubishi Chemical Corporation); Raven 5750, Raven 5250, Raven 5000, Raven 3500, Raven 1255, Raven 700, or the like (manufactured by Carbon Columbia); Regal 400R, Regal 330R, Regal 660R, Mogul L, Monarch 700, Monarch 800, Monarch 880, Monarch 900, Monarch 1000, Monarch 1100, Monarch 1300, Monarch 1400, or the like (manufactured by CABOT JAPAN K.K.); Color Black FW1, Color Black FW2, Color Black FW2V, Color Black FW18, Color Black FW200, Color Black 5150, Color Black 5160, Color Black 5170, Printex 35, Printex U, Printex V, Printex 140U, Special Black 6, Special Black 5, Special Black 4A, or Special Black 4 (manufactured by Degussa).

Although a pigment used for the yellow ink is not particularly limited, for example, there may be mentioned EMACOL SF Yellow J701F (trade name, manufactured by Sanyo Color Works, Ltd.); or C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, or 180.

Although a pigment used for the white ink is not particularly limited, for example, there may be mentioned C.I. Pigment Yellow 6, 18, or 21, titanium oxide, zinc oxide, zinc sulfide, antimony oxide, zirconium oxide, white hollow resin particles, or white high molecular weight particles.

Although a pigment other than those mentioned above is not particularly limited, for example, there may be mentioned C.I. Pigment Green 7 or 10; C.I. Pigment Brown 3, 5, 25, or 26; or C.I. Pigment Orange 1, 2, 5, 7, 13, 14, 15, 16, 24, 34, 36, 38, 40, 43, or 63.

A content of the pigment in terms of a solid content with respect to the total mass of the ink composition or the treatment liquid composition is preferably 2.0 percent by mass or more, more preferably 2.0 to 10 percent by mass, and further preferably 2.0 to 5.0 percent by mass. Since the content of the pigment is in the range described above, a recorded matter more excellent in color development tends to be obtained.

The content of the pigment in the ink composition is preferably larger than the content of the pigment in the treatment liquid composition.

Organic Solvent

The ink composition of this embodiment preferably contains an organic solvent. The treatment liquid composition of this embodiment may also contain an organic solvent. The organic solvent is not particularly limited as long as being usable together with water.

Although the type of organic solvent is not particularly limited, for example, there may be mentioned a cyclic nitrogen-containing compound, an aprotic polar solvent, a monoalcohol, an alkylpolyol, or a glycol ether.

Although the aprotic polar solvent is not particularly limited, for example, a cyclic ketone compound, a chain ketone compound, or a chain nitrogen-containing compound may be mentioned. In addition, as the cyclic nitrogen-containing compound and the aprotic polar solvent, for example, a pyrrolidone, an imidazolidinone, a sulfoxide, a lactone, an amide ether, or an imidazole may be mentioned as a representative solvent example. Although the pyrrolidone is not particularly limited as long as having a pyrrolidone skeleton, for example, 2-pyrrolidone, an N-alkyl-2-pyrrolidone, or a 1-alkyl-2-pyrrolidone may be mentioned. As the imidazolidinone, for example, 1,3-dimethyl-2-imidazolidinone may be mentioned; as the sulfoxide, for example, dimethylsulfoxide may be mentioned; as the lactone, for example, γ-butyrolactone may be mentioned; and as the imidazole, for example, imidazole, 1-methylimidazole, 2-methylimidazole, or 1,2-dimethylimidazole may be mentioned.

Although the monoalcohol is not particularly limited, for example, there may be mentioned methanol, ethanol, n-propyl alcohol, iso-propyl alcohol, n-butanol, 2-butanol, tert-butanol, iso-butanol, n-pentanol, 2-pentanol, 3-pentanol, or tert-pentanol.

Although the alkyl polyol is not particularly limited, for example, there may be mentioned glycerin, ethylene glycol, diethylene glycol, triethylene glycol, propylene glycol (1,2-propanediol), dipropylene glycol, trimethylolpropane, 1,3-propylene glycol (1,3-propanediol), isobutylene glycol (2-methyl-1,2-propanediol), 1,2-butanediol, 1,3-butanediol, 1,4-butanediol, 2-butene-1,4-diol, 1,2-pentanediol, 1,5-pentanediol, 2-methyl-2,4-pentanediol, 1,2-hexanediol, 1,6-hexanediol, 2-ethyl-1,3-hexanediol, 1,7-heptanediol, or 1,8-octanediol. In order to obtain an excellent storage stability, among those mentioned above, the organic solvent in the composition preferably includes any one of 1,3-propanediol, 1,4-butanediol, and 1,5-pentanediol and also preferably includes trimethylolpropane.

As the organic solvent, a water-soluble organic solvent is preferable. The "water-soluble" indicates the condition in which after water and an organic solvent are mixed and stirred at a mass ratio of 1:1 at ordinary temperature, no separation therebetween is observed, or no cloudy state is confirmed.

Although the glycol ether is not particularly limited, for example, a glycol diether or a glycol monoether may be mentioned.

A content of the organic solvent with respect to the total mass of the ink composition or the treatment liquid composition is preferably 0.1 to 50 percent by mass, more preferably 0.5 to 35 percent by mass, and further preferably 1.0 to 20 percent by mass. Since the content of the organic solvent is in the range described above, a drying property of the composition which is adhered to a recording medium tends to be further improved, and a recorded matter more excellent in fastness tends to be obtained.

A recording method of this embodiment includes an adhering step of adhering the treatment liquid composition described above to a cloth and a heating step of heating the cloth obtained in the adhering step. Hereinafter, the steps of the recording method of this embodiment each will be described with reference to an example including a step (pretreatment step) in which the treatment liquid composition is adhered before the ink composition is adhered (Figure).

Pretreatment Step (ST1)

The recording method of this embodiment includes a pretreatment step of adhering the treatment liquid composition to a cloth. As a method to adhere the treatment liquid composition to a cloth, for example, a method in which a cloth is dipped in the treatment liquid composition, a method in which the treatment liquid composition is applied by a roll coater or the like, or a method (such as an ink jet method or a spray method) in which the treatment liquid composition is jetted may be mentioned, and any one of the above methods may be used. The treatment liquid composition is preferably applied by an ink jet method since the treatment liquid composition can be easily controlled so as to be uniformly applied to a cloth. In addition, dipping coating, roller coating, or spray coating is preferably performed since the treatment liquid composition can be applied to a cloth in a short time.

The recording method of this embodiment preferably includes, after the step of adhering the treatment liquid composition to a cloth, a drying step of drying the treatment liquid composition applied to the cloth. Although the treatment liquid composition may be spontaneously dried, in order to increase a drying rate, the drying is preferably performed with heating. When the drying step of drying the treatment liquid composition is performed with heating, although a heating method is not particularly limited, for example, a convection heat drying method, a radiant heat drying method, a conductive heat drying method, or a method to be performed in combination therebetween may be mentioned. In addition, although a heat source of the heating is not particularly limited, for example, a combustion burner using a flammable gas or thermal infrared rays (lamp) generated from a carbon heater, a ceramic heater, a halogen lamp, or an infrared lamp may be mentioned.

In addition, the heating step of heating the cloth obtained in the adhesion step described above may be the drying step described above or a heat treatment step which will be described later, or the drying step and the heat treatment step may be performed in combination as the heating step of heating the cloth obtained in the adhesion step.

The heating step of heating the cloth obtained in the adhesion step is preferably a step of heating the cloth at a temperature higher than or equal to a thermal dissociation temperature of the block isocyanate compound. Accordingly, a reaction between the block isocyanate compound and the hydroxyethyl cellulose is promoted. For example, when the block isocyanate compound is blocked by methyl ethyl ketoxime, the heating temperature is preferably set to 140° C. or more. In addition, when the block isocyanate compound is blocked by dimethyl pyrazole, the heating temperature is preferably set to 110° C. or more.

In particular, although the heating temperature in the drying step is not particularly limited, for example, the heating temperature is preferably set to 80° C. to 180° C. Since the heating temperature is set to 180° C. or less, damage done on the cloth by a thermal stress during the heating and the drying can be reduced. Since the heating temperature is set to 80° C. or more, moisture, the solvent, and the like contained in the treatment liquid composition can be efficiently evaporated, so that the drying of the cloth thus treated can be promoted.

Although a material forming a cloth to be used in the recording method of this embodiment is not particularly limited, for example, natural fibers, such as cotton, hemp, wool, or silk; synthetic fibers, such as a polypropylene, a polyester, a nylon, an acetate, a triacetate, a polyamide, or a polyurethane; or biodegradable fibers such as a polylactic acid may be mentioned, and in addition, blended fibers among those mentioned above may also be mentioned. As the cloth, for example, a fabric, a knitted fabric, or a non-woven cloth formed from the fibers mentioned above may be used. Among the materials forming the above cloths, when fibers having hydroxy groups are used, that is, for example, when cotton is used, since the isocyanate group of the block isocyanate compound also reacts with the hydroxy group of the cloth, the hydroxy group of the cloth is inactivated, and the cloth has a water resistance, so that a recorded matter more excellent in fastness (in particular, wet rubbing fastness) can be obtained. In addition, in view of dyeing property, a cloth containing fibers (cotton, hemp, rayon, or the like) primarily formed from a cellulose is also preferably used.

Printing Step (ST2)

The recording method of this embodiment includes a printing step of printing the ink composition described above to the cloth. In particular, ink droplets ejected by an ink jet recording method are adhered to the cloth to form an image thereon. As the ink jet recording method, for example, any one of a charge deflection method, a continuous method, and an on-demand method (a piezoelectric type or a bubble jet (registered trademark) type) may be mentioned. Among those ink jet recording methods, a method using a piezoelectric type ink jet recording device is particularly preferable.

Heat Treatment Step (ST3)

The recording method of this embodiment includes a heat treatment step of performing a heat treatment on the cloth to which the ink composition described above is printed. By the heat treatment step, the pigment is preferably dyed on the fibers. The heat treatment step may be performed using a related known method, and for example, an HT method (high temperature steaming method), an HP method (high pressure steaming method), or a thermosol method may be mentioned.

EXAMPLES

Hereinafter, although the present disclosure will be described in more detail with reference to examples, the present disclosure is not limited thereto. Hereinafter, unless otherwise particularly noted, "part(s)" and "%" are each on a mass basis.

Materials of Treatment Liquid Composition and Ink Composition

In the following examples and comparative examples, main materials used for the treatment liquid composition and the ink composition are as described below.

Cross-Linking Agent

Toluene diisocyanate derivative ("Meikanate TP-10", manufactured by Meisei Chemical Works, Ltd., toluene diisocyanate derivative, non-ionic property, dissociation temperature: 120° C. to 160° C., methyl ethyl ketoxime (MEKO) blocking agent)

Hexamethylene diisocyanate derivative 1 ("NBP-211", manufactured by Meisei Chemical Works, Ltd., hexamethylene diisocyanate derivative, non-ionic property, dissociation temperature: 120° C. to 160° C., MEKO blocking agent)

Hexamethylene diisocyanate derivative 2 ("AQUA BI220", manufactured by Baxenden, dimethylpyrazole (DMP) blocking agent)

Thickening Agent

Hydroxyethyl cellulose ("Reogard MGP", manufactured by Lion Specialty Chemicals Co., Ltd.)

Carboxymethyl cellulose ("CMC Daicel 1240", manufactured by Daicel Miraizu Ltd.)

Polyvinyl pyrrolidone ("Pitzcol K90-L", manufactured by DKS Co., Ltd.)

Cationic Compound

Calcium chloride dihydrate (polyvalent metal salt)

Calcium nitrate tetrahydrate (polyvalent metal salt)

Polyallyamine polymer 1 ("PAA-HCL-03", manufactured by Nittobo Medical Co., Ltd., cationic polymer)

Polyallyamine polymer 2 ("PAA-03", manufactured by Nittobo Medical Co., Ltd., cationic polymer) RESIN PARTICLES Urethane-based resin 1 ("Superflex 620", manufactured by DKS Co., Ltd., cationic property, abbreviated as "SF-620" in Table)

Urethane-based resin 2 ("Takelac WS-6021", manufactured by Mitsui Chemicals Inc.) SURFACTANT Acetylene glycol 1 ("Surfynol 485", manufactured by Nisshin Chemical Industry Co., Ltd., HLB value: 17, surface tension: 51 mN/m (catalog value measured using 0.1% aqueous solution)

Acetylene glycol 2 ("Olfine E1010", manufactured by Nisshin Chemical Industry Co., Ltd., HLB value: 13 to 14, surface tension: 40 mN/m (catalog value measured using 0.1% aqueous solution)

Acetylene glycol 3 ("Surfynol 104", manufactured by Nisshin Chemical Industry Co., Ltd., HLB value: 4) ANTISEPTIC AGENT Proxel XL2 (trade name, manufactured by Arch Chemicals) WATER Purified water PIGMENT Black pigment dispersion (carbon black pigment) ORGANIC SOLVENT Glycerin Trimethylolpropane Triethylene glycol Potassium hydroxide (KOH)

Sodium ethylenediaminetetraacetatic acid (EDTA)

Preparation of Treatment Liquid Composition and Ink Composition

Components were mixed and sufficiently stirred to form the compositions shown in Tables 1 are 2, so that treatment liquid compositions and ink compositions were obtained. In addition, in the following Tables 1 and 2, the units of the numerical values of the components other than the organic solvent and the water are each percent by mass of a solid content, the unit of the numerical value of the organic solvent is percent by mass, and the water is contained so that the total of the composition is 100.0 percent by mass. In addition, the black pigment dispersion shown in Table 2 was prepared such that after 65 parts by mass of a pigment was mixed with 35 parts by mass of Joncryl 611 (trade name, manufactured by BASF Japan Ltd.), which was a styrene acrylic-based dispersion resin not shown in the table, 1.70 parts by mass of potassium hydroxide, and 250 parts by mass of ultrapure water purified by an ion-exchange method and a reverse osmosis method and was then dispersed for 10 hours by a ball mill using zirconia beads, coarse and large particles were removed by filtration using glass-fiber filter paper GA-100 (trade name, manufactured by Advantec Toyo Kaisha, Ltd.), and the composition was prepared so as to have a pigment concentration of 10 percent by mass.

TABLE 1

| | | TREATMENT LIQUID COMPOSITION 1 | TREATMENT LIQUID COMPOSITION 2 | TREATMENT LIQUID COMPOSITION 3 | TREATMENT LIQUID COMPOSITION 4 |
|---|---|---|---|---|---|
| CROSS-LINKING AGENT | TOLUENE DIISOCYANATE DERIVATIVE | 1.0 wt % | — | — | — |
| | HEXAMETHYLENE DIISOCYANATE DERIVATIVE 1 | — | 1.0 wt % | 1.0 wt % | 1.0 wt % |
| | HEXAMETHYLENE DIISOCYANATE DERIVATIVE 2 | — | — | — | — |
| THICKENING AGENT | HYDROXYETHYL CELLULOSE | 0.5 wt % | 0.5 wt % | 0.5 wt % | 0.1 wt % |
| | CARBOXYMETHYL CELLULOSE | — | — | — | — |
| | POLYVINYL PYRROLIDONE | — | — | — | — |
| CATIONIC COMPOUND | CALCIUM CHLORIDE DIHYDRATE | 2.0 wt % | 2.0 wt % | 2.0 wt % | 2.0 wt % |
| | CALCIUM NITRATE TETRAHYDRATE | — | — | — | — |
| | POLYALLYLAMINE POLYMER 1 | 1.0 wt % | — | — | 1.0 wt % |
| | POLYALLYLAMINE POLYMER 2 | — | 1.0 wt % | — | — |
| RESIN PARTICLES | URETHANE-BASED RESIN 1 | — | — | 1.0 wt % | — |
| SURFACTANT | ACETYLENE GLYCOL 1 | 1.0 wt % | 1.0 wt % | 1.0 wt % | 1.0 wt % |
| | ACETYLENE GLYCOL 2 | — | — | — | — |

TABLE 1-continued

| | | | | | |
|---|---|---|---|---|---|
| ANTISEPTIC AGENT | PROXEL XL2 | 0.2 wt % | 0.2 wt % | 0.2 wt % | 0.2 wt % |
| PURIFIED WATER | | BALANCE | BALANCE | BALANCE | BALANCE |

| | | | TREATMENT LIQUID COMPOSITION 5 | TREATMENT LIQUID COMPOSITION 6 | TREATMENT LIQUID COMPOSITION 7 |
|---|---|---|---|---|---|
| CROSS-LINKING AGENT | | TOLUENE DIISOCYANATE DERIVATIVE | — | — | — |
| | | HEXAMETHYLENE DIISOCYANATE DERIVATIVE 1 | 1.0 wt % | — | 1.0 wt % |
| | | HEXAMETHYLENE DIISOCYANATE DERIVATIVE 2 | — | 1.0 wt % | — |
| THICKENING AGENT | | HYDROXYETHYL CELLULOSE | 1.0 wt % | 0.5 wt % | 0.5 wt % |
| | | CARBOXYMETHYL CELLULOSE | — | — | — |
| | | POLYVINYL PYRROLIDONE | — | — | — |
| CATIONIC COMPOUND | | CALCIUM CHLORIDE DIHYDRATE | 2.0 wt % | 2.0 wt % | 2.0 wt % |
| | | CALCIUM NITRATE TETRAHYDRATE | — | — | — |
| | | POLYALLYLAMINE POLYMER 1 | 1.0 wt % | 1.0 wt % | — |
| | | POLYALLYLAMINE POLYMER 2 | — | — | 1.0 wt % |
| RESIN PARTICLES | | URETHANE-BASED RESIN 1 | — | — | — |
| SURFACTANT | | ACETYLENE GLYCOL 1 | 1.0 wt % | 1.0 wt % | — |
| | | ACETYLENE GLYCOL 2 | — | — | 1.0 wt % |
| ANTISEPTIC AGENT | | PROXEL XL2 | 0.2 wt % | 0.2 wt % | 0.2 wt % |
| PURIFIED WATER | | | BALANCE | BALANCE | BALANCE |

| | | | TREATMENT LIQUID COMPOSITION 8 | TREATMENT LIQUID COMPOSITION 9 | TREATMENT LIQUID COMPOSITION 10 |
|---|---|---|---|---|---|
| CROSS-LINKING AGENT | | TOLUENE DIISOCYANATE DERIVATIVE | — | — | — |
| | | HEXAMETHYLENE DIISOCYANATE DERIVATIVE | 1.0 wt % | 0.2 wt % | 4.0 wt % |
| | | HEXAMETHYLENE DIISOCYANATE DERIVATIVE | — | — | — |
| THICKENING AGENT | | HYDROXYETHYL CELLULOSE | 0.5 wt % | 0.5 wt % | 0.5 wt % |
| | | CARBOXYMETHYL CELLULOSE | — | — | — |
| | | POLYVINYL PYRROLIDONE | — | — | — |
| CATIONIC COMPOUND | | CALCIUM CHLORIDE DIHYDRATE | — | 2.0 wt % | 2.0 wt % |
| | | CALCIUM NITRATE TETRAHYDRATE | — | — | — |
| | | POLYALLYLAMINE POLYMER 1 | — | — | — |
| | | POLYALLYLAMINE POLYMER 2 | 1.0 wt % | — | — |
| RESIN PARTICLES | | URETHANE-BASED RESIN 1 | — | 1.0 wt % | 1.0 wt % |
| SURFACTANT | | ACETYLENE GLYCOL 1 | — | 1.0 wt % | 1.0 wt % |
| | | ACETYLENE GLYCOL 2 | 1.0 wt % | — | — |
| ANTISEPTIC AGENT | | PROXEL XL2 | 0.2 wt % | 0.2 wt % | 0.2 wt % |
| PURIFIED WATER | | | BALANCE | BALANCE | BALANCE |

| | | | TREATMENT LIQUID COMPOSITION 11 | TREATMENT LIQUID COMPOSITION 12 | TREATMENT LIQUID COMPOSITION 13 |
|---|---|---|---|---|---|
| CROSS-LINKING AGENT | | TOLUENE DIISOCYANATE DERIVATIVE | 1.0 wt % | 1.0 wt % | — |
| | | HEXAMETHYLENE DIISOCYANATE DERIVATIVE | — | — | — |
| | | HEXAMETHYLENE DIISOCYANATE DERIVATIVE | — | — | — |
| THICKENING AGENT | | HYDROXYETHYL CELLULOSE | — | — | 0.5 wt % |
| | | CARBOXYMETHYL CELLULOSE | 0.5 wt % | — | — |
| | | POLYVINYL PYRROLIDONE | — | 0.5 wt % | — |
| CATIONIC COMPOUND | | CALCIUM CHLORIDE DIHYDRATE | 2.0 wt % | 2.0 wt % | 2.0 wt % |
| | | CALCIUM NITRATE TETRAHYDRATE | — | — | — |
| | | POLYALLYLAMINE POLYMER 1 | 1.0 wt % | 1.0 wt % | 1.0 wt % |
| | | POLYALLYLAMINE POLYMER 2 | — | — | — |
| RESIN PARTICLES | | URETHANE-BASED RESIN 1 | — | — | — |
| SURFACTANT | | ACETYLENE GLYCOL 1 | 1.0 wt % | 1.0 wt % | 1.0 wt % |
| | | ACETYLENE GLYCOL 2 | — | — | — |
| ANTISEPTIC AGENT | | PROXEL XL2 | 0.2 wt % | 0.2 wt % | 0.2 wt % |
| PURIFIED WATER | | | BALANCE | BALANCE | BALANCE |

TABLE 2

|  | INK COMPOSITION |
| --- | --- |
| BLACK PIGMENT DISPERSION | 5 |
| URETHANE-BASED RESIN 2 | 6 |
| ACETYLENE GLYCOL 2 | 1 |
| ACETYLENE GLYCOL 3 | 0.5 |
| GLYCERIN | 6 |
| TRIMETHYLOLPROPANE | 8 |
| TRIETHYLENE GLYCOL | 5 |
| EDTA | 0.1 |
| KOH | 0.1 |
| PURIFIED WATER | BALANCE |

Formation of Printed Matter

On a 100%-cotton cloth, the treatment liquid composition was uniformly applied by a roller so as to have an amount of 7 g per an A4 size. After the application, a heat treatment was performed at 160° C. for 2.5 minutes by radiant heat using a conveyor drying furnace ("Economax D" manufactured by M&D). Subsequently, by an ink jet method using an ink jet printer ("PX-G930" manufactured by Seiko Epson Corporation), the ink composition was adhered to the cloth. As recording conditions, a recording resolution, a printing range, and a recording range were set to 1,440 dpi×720 dpi, 210 mm×297 mm, and an A4 size, respectively, and a printed matter in which a solid pattern image at a duty of 100% was formed on the cloth used as a recording medium by a black ink (ink was printed) was formed. The printed matter thus formed was dried at 160° C. for 5 minutes by radiant heat using a conveyor continuous dryer.

In this case, the "solid pattern image" indicates an image in which dots are recorded in all pixels each of which is a minimum recording unit region defined by a recording resolution.

Color Development

An optical density (hereinafter, also referred to as "OD value") of the printed matter at 25° C. was measured using a fluorescent spectrum densitometer ("FD-7", manufactured by Konica Minolta, Inc.), and by the following evaluation criteria, the color development was evaluated. In addition, a larger OD value indicates a more excellent color development.

Evaluation Criteria

S: OD value of 1.5 or more (particularly preferable)
A: OD value of 1.4 to less than 1.5 (preferable)
B: OD value of 1.25 to less than 1.4
C: OD value of less than 1.25

Fastness

By a test method in accordance with ISO105-X12, color migration and discoloration of the printed matter were each evaluated by dry and wet rubbing strengths thereof, and the fastness of the printed matter was evaluated by the following evaluation criteria. In addition, a smaller difference in OD value indicates a more excellent fastness.

Color Migration

Dry Rubbing Strength

S: difference in OD value before and after rubbing test is less than 0.15.
A: difference in OD value before and after rubbing test is 0.15 to less than 0.20.
B: difference in OD value before and after rubbing test is 0.20 to less than 0.25.
C: difference in OD value before and after rubbing test is 0.25 or more.

Wet rubbing strength S: difference in OD value before and after rubbing test is less than 0.20.
A: difference in OD value before and after rubbing test is 0.20 to less than 0.25.
B: difference in OD value before and after rubbing test is 0.25 to less than 0.30.
C: difference in OD value before and after rubbing test is 0.30 or more.

Discoloration

Dry Rubbing Strength

S: difference in OD value before and after rubbing test is less than 0.15 (particularly preferable).
A: difference in OD value before and after rubbing test is 0.15 to less than 0.20 (preferable).
B: difference in OD value before and after rubbing test is 0.20 to less than 0.25.
C: difference in OD value before and after rubbing test is 0.25 or more.

Wet Rubbing Strength

S: difference in OD value before and after rubbing test is less than 0.20 (particularly preferable).
A: difference in OD value before and after rubbing test is 0.20 to less than 0.25 (preferable).
B: difference in OD value before and after rubbing test is 0.25 to less than 0.30.
C: difference in OD value before and after rubbing test is 0.30 or more.

TABLE 3

|  |  |  | EXAMPLE 1 TREATMENT LIQUID COMPOSITION 1 | EXAMPLE 2 TREATMENT LIQUID COMPOSITION 2 | EXAMPLE 3 TREATMENT LIQUID COMPOSITION 3 | EXAMPLE 4 TREATMENT LIQUID COMPOSITION 4 |
| --- | --- | --- | --- | --- | --- | --- |
| COLOR DEVELOPMENT |  |  | A | A | A | B |
| RUBBING FASTNESS | COLOR MIGRATION | DRY RUBBING STRENGTH | S | S | S | S |
|  |  | WET RUBBING STRENGTH | A | A | A | S |
|  | DISCOLORATION | DRY RUBBING STRENGTH | S | S | S | S |
|  |  | WET RUBBING STRENGTH | A | A | A | S |

TABLE 3-continued

| | | | EXAMPLE 5 TREATMENT LIQUID COMPOSITION 5 | EXAMPLE 6 TREATMENT LIQUID COMPOSITION 6 | EXAMPLE 7 TREATMENT LIQUID COMPOSITION 7 |
|---|---|---|---|---|---|
| | COLOR DEVELOPMENT | | S | A | B |
| RUBBING FASTNESS | COLOR MIGRATION | DRY RUBBING STRENGTH | A | S | S |
| | | WET RUBBING STRENGTH | B | A | A |
| | DISCOLORATION | DRY RUBBING STRENGTH | A | S | S |
| | | WET RUBBING STRENGTH | B | S | A |

| | | | EXAMPLE 8 TREATMENT LIQUID COMPOSITION 8 | EXAMPLE 9 TREATMENT LIQUID COMPOSITION 9 | EXAMPLE 10 TREATMENT LIQUID COMPOSITION 10 |
|---|---|---|---|---|---|
| COLOR DEVELOPMENT | | | B | A | B |
| RUBBING FASTNESS | COLOR MIGRATION | DRY RUBBING STRENGTH | S | A | S |
| | | WET RUBBING STRENGTH | A | B | S |
| | DISCOLORATION | DRY RUBBING STRENGTH | S | A | S |
| | | WET RUBBING STRENGTH | S | B | S |

| | | | COMPARATIVE EXAMPLE 1 TREATMENT LIQUID COMPOSITION 11 | COMPARATIVE EXAMPLE 2 TREATMENT LIQUID COMPOSITION 12 | COMPARATIVE EXAMPLE 3 TREATMENT LIQUID COMPOSITION 13 |
|---|---|---|---|---|---|
| | COLOR DEVELOPMENT | | A | A | A |
| RUBBING FASTNESS | COLOR MIGRATION | DRY RUBBING STRENGTH | A | A | A |
| | | WET RUBBING STRENGTH | C | C | C |
| | DISCOLORATION | DRY RUBBING STRENGTH | A | A | A |
| | | WET RUBBING STRENGTH | C | C | C |

Evaluation Results

As for the color migration and the discoloration of the printed matter of each of the examples formed using the treatment liquid composition of this embodiment, the evaluation results of the dry and the wet rubbing strengths are "B" or more, that is, are ranked as "B", "A", or "S", and accordingly, it is understood that the dry and the wet rubbing strengths are both excellent in terms of the color migration and the discoloration.

What is claimed is:

1. A treatment liquid composition for ink jet pigment printing to be adhered to a cloth, the treatment liquid composition comprising:
   a block isocyanate compound;
   a hydroxyethyl cellulose in an amount that ranges between 0.01 to 0.1 % by mass; and
   a cationic compound,
   wherein the block isocyanate compound includes an aliphatic diisocyanate.

2. The treatment liquid composition for ink jet pigment printing, according to claim 1,
   wherein the cloth contains fibers having hydroxy groups.

3. The treatment liquid composition for ink jet pigment printing, according to claim 1,
   wherein the cationic compound contains a polyvalent metal salt or a cationic polymer.

4. The treatment liquid composition for ink jet pigment printing, according to claim 1,
   wherein the block isocyanate compound is blocked by dimethyl pyrazole or methyl ethyl ketoxime.

5. The treatment liquid composition for ink jet pigment printing, according to claim 1,
   further comprising cationic or nonionic resin particles.

6. The treatment liquid composition for ink jet pigment printing, according to claim 1,
   further comprising a surfactant,
   wherein the surfactant includes an acetylene glycol-based surfactant having an HLB value of 10 or more.

7. The treatment liquid composition for ink jet pigment printing, according to claim 6,
   wherein the surfactant has a surface tension of 40 mN/m or more in an aqueous solution at a concentration of 0.1 percent by mass.

8. An ink set comprising:
   the treatment liquid composition for ink jet pigment printing according to claim 1; and
   an ink composition containing a pigment.

9. A recording method comprising:
   an adhesion step of adhering the treatment liquid composition for ink jet pigment printing according to claim 1 to a cloth; and
   a heating step of heating the cloth obtained in the adhesion step.

10. The recording method according to claim 9, wherein the heating step is a step of heating the cloth at a temperature higher than or equal to a thermal dissociation temperature of the block isocyanate compound.

* * * * *